United States Patent [19]

Takeuchi et al.

[11] 4,416,191
[45] Nov. 22, 1983

[54] VACUUM BOOSTER DEVICE

[75] Inventors: Hiroo Takeuchi, Asashina; Nobuaki Hachiro; Yoshihisa Miyazaki, both of Ueda, all of Japan

[73] Assignee: Nissin Kogyo Kabushiki Kaisha, Nagano, Japan

[21] Appl. No.: 261,149

[22] Filed: May 7, 1981

[30] Foreign Application Priority Data

Sep. 19, 1980 [JP] Japan .......................... 55-133437[U]

[51] Int. Cl.³ .............................................. F16J 15/18
[52] U.S. Cl. .............................. 92/165 PR; 60/547.1; 92/98 D
[58] Field of Search ................. 60/547 R; 92/165 PR, 92/166, 98 D

[56] References Cited

U.S. PATENT DOCUMENTS

| 4,270,353 | 6/1981 | Thomas | 91/369 A |
| 4,325,218 | 4/1982 | Weiler | 92/165 PR |
| 4,328,738 | 5/1982 | Hamamatsu | 92/165 PR |
| 4,330,996 | 5/1982 | Becht | 60/581 |
| 4,339,921 | 7/1982 | Schanz | 92/165 PR |

*Primary Examiner*—Abraham Hershkovitz
*Attorney, Agent, or Firm*—Armstrong, Nikaido, Marmelstein & Kubovcik

[57] ABSTRACT

A vacuum type brake booster device comprising a booster shell divided into front and rear halves, a booster piston accommodated in the booster shell, and tie rods extending through the booster piston for connection of the front and rear halves. The tie rod is firmly held upright at a prescribed position on the rear half wall by the combined action of a mounting support on the rear half wall, a stepped tie rod flange, an elastic sealing member disposed in said mounting support between the rear half wall and the stepped flange, a retainer ring inside the mounting support. Accordingly, the tie rod thus firmly secured to the rear half is readily aligned with and pass through a through hole in the front half to expedite the assembly of the front and rear halves and, in addition, use of the elastic sealing member contributes to the simplification of the construction.

6 Claims, 1 Drawing Figure

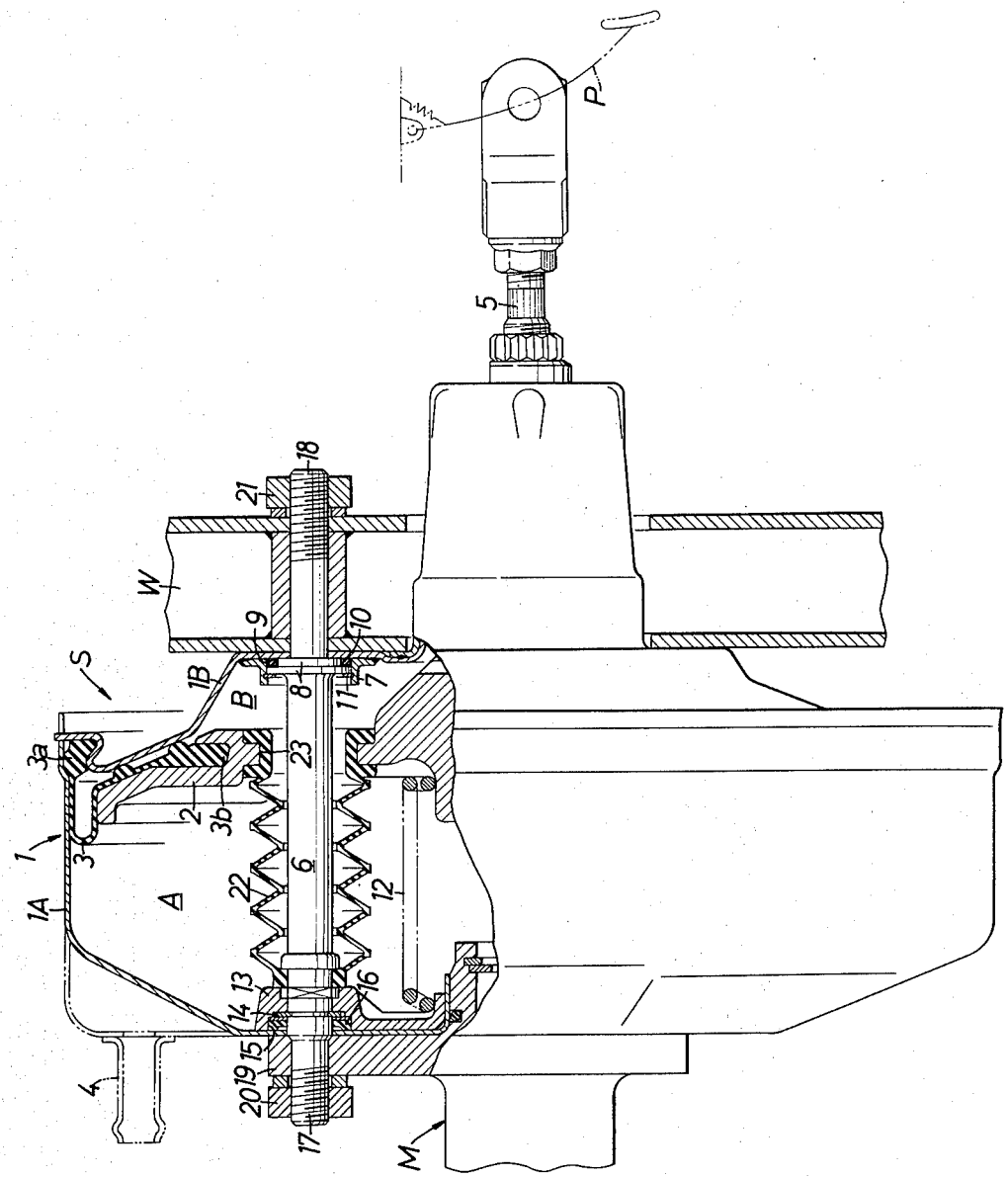

VACUUM BOOSTER DEVICE

BACKGROUND OF THE INVENTION

This invention relates to vacuum booster devices for boosting a master cylinder of automotive hydraulic brake, clutch or the like with vacuum pressure and, more particularly, to improvements in those of the type comprising a booster shell divided into a front bowl and a rear bowl, a booster piston accommodated in the booster shell, and tie rods extending through the booster piston for connection of the front and rear bowls.

Conventionally, when a vacuum booster device of the above type installed in an automobile operates the master cylinder, frontward thrust loaded on the master cylinder is directly transmitted to and supported on the automobile body through the tie rods and not on the booster shell, so that the booster shell can be made thinner and lighter.

In assembling this booster device, the rear end of the tie rod is connected to the rear bowl first, and, after the front bowl is fitted to the rear bowl, front end of the tie rod is connected to the front bowl, However, for easily assembling both the bowls without any interference by the tie rods, the tie rods should firmly be fixed upright at prescribed positions in the rear bowls.

SUMMARY OF THE INVENTION

The present invention has been proposed to satisfy such requirements are mentioned above and has for its primary object the provision of a new and improved vacuum booster device of the type described which is of simple but effective construction capable of securely sealing the tie rod through-hole in the rear bowl.

The above and other objects, features and advantages of the present invention will become apparent from the following description when taken in conjunction with the accompanying drawings, which illustrate a presently preferred embodiment of the invention.

BRIEF DESCRIPTION OF THE DRAWING

In the drawing, the single FIGURE is a longitudinal cross-sectional view in side elevation illustrating a preferred form of vacuum booster device embodying the present invention.

DESCRIPTION OF THE PREFERRED EMBODIMENT

An embodiment of the present invention will be explained with reference to the drawing. In the FIGURE, a vacuum booster device according to the present invention, generally denoted by S, is installed in front side of a compartment wall W forming a rear side wall of an engine room, and a brake master cylinder M is fitted to the front side of the booster device S.

The interior space of the booster shell 1 of the booster device S is divided into a front side first working chamber A and a rear side second working chamber B by booster piston 2 axially slidably accommodated therein and a piston diaphragm 3 of which inner bead 3b is fixed to the rear side of the piston 2. An outer bead 3a of the piston diaphragm 3 is fixed to the booster shell 1. The first working chamber A is always held in communication with a vacuum source, not shown, through a vacuum inlet pipe 4, while the second working chamber B is adapted to be selectively placed in communication with the first working chambers A or the atmosphere through a control valve, not shown, actuated by an input rod 5 which is operated by a brake pedal P. When the second working chamber B is communicated with the atmosphere, a pressure differential is produced between the working chambers A and B to apply a thrust to the booster piston 2 to move the latter forwards, thereby operating the master cylinder M.

The booster shell 1 is divided into a front side first bowl 1A and a rear side second bowl 1B which are connected together through singular or plural tie rods 6 axially extending through the booster piston 2 in the following way.

A stepped flange 8 having a large flange portion and a small flange portion is integrally formed around the outer periphery of the tie rod 6 and fitted in a cylinder mounting support 7 which is welded to the inside surface of the rear wall of the rear bowl 1B and through which the tie rod 6 extends. An elastic sealing member 10 is disposed in an annular housing, or recess, 9 defined by the stepped flange 8, the mounting support 7 and the rear wall of the rear bowl 1B for sealing the tie rod through-hole of the rear bowl 1B. A retainer ring 11 is engaged in the inner wall of the mounting support 7 so as to hold the large flange portion of the stepped flange 8 in abutment with the sealing member 10. The tie rod 6 in the rear bowl 1B is positioned by fitting of the stepped flange 8 in the mounting support 7, and the stepped flange 8 is urged against the retainer ring 11 by elestic force of the sealing member 10, so that the tie rod 6 can be held upright in an appropriate and immovable manner.

A spring retainer plate 13 for retaining the fixed end of a return spring 12 for the booster piston 2 is fixed to the front end of the tie rod 6 by means of a retainer ring 14, and is abutted against the front inside wall of the front bowl 1A when both the front and rear bowls 1A, 1B are fitted together. An ealstic sealing member 16 is disposed in an annular housing 15 formed in the spring retainer plate 13 for sealing the tie rod through-hole of the front bowl 1A.

The tie rod 6 has opposite ends protruded from the front and rear sides of the booster shell 1 to form mounting bolts 17 and 18. The front mounting bolt 17, which extends through the mounting flange 19 of the brake master cylinder M placed on the front surface of the booster shell 1, is tightly screwed at its tip end to a nut 20, whereby the tie rod 6, spriing retainer plate 13, front bowl 1A and mounting flange 19 are integrally connected with one another. The rear mounting bolt 18 extending through the compartment wall W is tightly screwed at its tip end to a nut 21 to integrally connect therwith the tie rod 6 and the rear bowl 1B.

A flexible bellows 22 surrounds the tie rod 6 inside the first working chamber A and the front end of the bellows 22 is tightly fitted to the outer periphery of the tie rod 6 while the rear end of the bellows is tightly fitted to a through hole 23 of the booster piston 2 for passing the tie rod 6 therethrough. Accordingly, due to the flexibility of the bellows 22, the through hole 23 is sealed by the bellows 22 in such a manner as not to prevent the operation of the booster piston 2.

To summarize, according to the present invention, a tie rod 6 is formed around its outer periphery with a stepped flange 8 having a large flange portion which is fitted in a mounting flange 7 secured to the inside surface of a rear bowl 1B of a booster shell 1 and an elastic sealing member 10 is disposed in a housing defined by the rear wall of the rear bowl 1B, the mounting support 7 and the stepped flange 8 so that the large flange portion is firmly held in place by the elastic sealing member 10 and a retainer ring 11 fixedly mounted in the mounting support 7. With the above arrangement, the tie rod 6 can be firmly held upright at a prescribed position on the rear bowl 1B in an appropriate manner by the combined action of the mounting support 7, the stepped flange 8, the sealing member 10 and the retainer ring 11 and others. Subsequently, in connecting the front and rear bowls 1A and 1B together, the front end of the tie rod 6 can be readily aligned with and smoothly pass through the through-hole formed in the front bowl 1A to expedite the assembly of the front and rear bowls. In addition, the sealing member 10 as used for seaing the tie rod through-hole of the rear bowl 1B has, besides such original sealing function, a spring function for holding the tie rod 6 in an upright position, thereby contributing to simplification of the construction.

While an embodiment of the present invention has been shown and described, it will be apparent to those skilled in the art that various changes and modifications may be made therein without departing from the spirit of the invention or the scope of the appended claims.

What is claimed is:

1. In a vacuum booster device comprising a booster shell divided into a front bowl and a rear bowl, a booster piston accommodated in said booster shell, and tie rods extending through said booster piston for connection of said front and rear bowls, the improvement comprising a mounting support fixedly secured to an inside surface of the rear wall of said rear bowl, a stepped flange integrally formed around the outer periphery of said tie rods and fitted in said mounting support, said stepped flange having a large flange portion and a small flange portion, an annular recess defined by said stepped flange, said mounting support and said rear wall of said rear bowl, an elastic sealing member disposed in said annular recess, a retainer ring mounted in said mounting support and cooperating wih said sealing member for firmly holding in place said large flange portion of said stepped flange.

2. A device as set forth in claim 1, wherein said small flange portion of said stepped flange abuts against the inside surface of said rear wall of said rear bowl and one end of said tie rod extends from said smaller flange portion of said stepped flange to pass through said rear wall, said one end of said tie rod being formed as a mounting bolt to which may be screwed a nut for firmly joining together said tie rod and said rear wall.

3. A device as set forth in claim 1, wherein said elastic sealiing member is fitted around said small flange portion between said large flange portion and said rear wall of said rear bowl.

4. In a vacuum booster device comprising a booster shell divided into a front bowl and a rear bowl, a booster piston accommodated in said booster shell, and tie rods extending through said booster piston for connection of said front and rear bowls, the improvement comprising a mounting support fixedly secured to an inside surface of the rear wall of said rear bowl, a stepped flange integrally formed around the outer periphery of said tie rods and fitted in said mounting support, said stepped flange having a large flange portion and a small flange portion, an annular recess defined by said stepped flange, said mounting support and said rear wall of said rear bowl, an elastic sealing member disposed in said annular recess, a retainer ring mounted in said mounting support and cooperating with said sealing member for firmly holding in place said large flange portion of said stepped flange, said small flange portion being in abutting engagement with the inside surface of the rear wall of said rear bowl, and said elastic sealing member being disposed in the annular recess around said small flange portion between the large flange portion and the inside surface of the rear wall of said rear bowl.

5. A device as set forth in claim 4, wherein one end of said tie rod extends from said smaller flange portion of said stepped flange to pass through said rear wall, said one end of said tie rod being formed as a mounting bolt to which may be screwed a nut for firmly joining together said tie rod and said rear wall.

6. A device as set forth in claim 4, wherein said elastic sealing member is fitted around said small flange portion between said large flange portion and said rear wall of said rear bowl.

* * * * *